United States Patent
Musante et al.

(10) Patent No.: US 11,030,367 B2
(45) Date of Patent: Jun. 8, 2021

(54) OUT-OF-CONTEXT FEEDBACK HIERARCHICAL LARGE BLOCK SYNTHESIS (HLBS) OPTIMIZATION

(71) Applicant: International Business Machines Corporation, Armonk, NY (US)

(72) Inventors: Frank Musante, Poughkeepsie, NY (US); Nathaniel Hieter, Clinton Corners, NY (US); Alexander Suess, Hopewell Junction, NY (US); Ofer Geva, Petah Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/567,115

(22) Filed: Sep. 11, 2019

(65) Prior Publication Data
US 2021/0073343 A1   Mar. 11, 2021

(51) Int. Cl.
G06F 30/00      (2020.01)
G06F 30/327    (2020.01)
G06F 30/392    (2020.01)
G06F 119/12    (2020.01)

(52) U.S. Cl.
CPC .......... *G06F 30/327* (2020.01); *G06F 30/392* (2020.01); *G06F 2119/12* (2020.01)

(58) Field of Classification Search
CPC .............................. G06F 30/327; G06F 30/392
USPC ........................................................ 716/104
See application file for complete search history.

(56) References Cited

U.S. PATENT DOCUMENTS

| 5,537,580 A | 7/1996 | Giomi et al. |
| 5,999,716 A | 12/1999 | Toyonaga |
| 6,292,925 B1 | 9/2001 | Dellinger et al. |
| 6,754,878 B1 | 6/2004 | Stentz et al. |

(Continued)

FOREIGN PATENT DOCUMENTS

WO    2008005622 A2    1/2008

OTHER PUBLICATIONS

Alpert et al., "Techniques for Fast Physical Synthesis" Proceedings of the IEEE 95.3 (Apr. 2007) pp. 573-599.

(Continued)

*Primary Examiner* — Suchin Parihar
(74) *Attorney, Agent, or Firm* — Cantor Colburn LLP; William Kinnaman

(57) ABSTRACT

A system to develop an integrated circuit includes a latch identifier module to identify a first child latch placed at a first location in a first child macro of a parent macro and a second child latch placed at a second location in a second child macro of the parent macro. The second child latch is located away from the first child latch. The system further includes a latch location optimization module and a latch placement module. The latch location optimization module determines a target timing parameter threshold and determines a first actual timing parameter. The latch placement module changes the first location of the first child latch and/or the second location of the second child latch to generate an optimized parent macro based on the changed locations. The latch location optimization module re-executes the latch optimization process to determine a second actual timing parameter based on the changed locations.

20 Claims, 3 Drawing Sheets

(56) References Cited

U.S. PATENT DOCUMENTS

| | | | |
|---|---|---|---|
| 6,920,625 B2 | 7/2005 | Gass | |
| 7,032,198 B2 | 4/2006 | Sano et al. | |
| 7,376,919 B1 * | 5/2008 | McElvain | G06F 30/3323 |
| | | | 716/103 |
| 7,490,307 B2 | 2/2009 | Fomaciari et al. | |
| 7,549,137 B2 | 6/2009 | Alpert et al. | |
| 7,624,366 B2 | 11/2009 | Alpert et al. | |
| 7,707,530 B2 | 4/2010 | Alpert et al. | |
| 7,890,901 B2 | 2/2011 | Gemmeke et al. | |
| 7,895,544 B2 | 2/2011 | Amundson | |
| 7,945,880 B1 | 5/2011 | Albrecht et al. | |
| 8,001,498 B2 | 8/2011 | Bjesse | |
| 8,141,019 B2 | 3/2012 | Curtin et al. | |
| 8,271,920 B2 | 9/2012 | Cho et al. | |
| 8,375,345 B1 * | 2/2013 | Barowski | G06F 30/30 |
| | | | 716/119 |
| 8,381,142 B1 | 2/2013 | Hutton | |
| 8,438,511 B1 | 5/2013 | Hurst | |
| 8,495,552 B1 | 7/2013 | Cho et al. | |
| 8,566,770 B2 | 10/2013 | Lilja | |
| 8,572,539 B2 | 10/2013 | Cortadella et al. | |
| 8,739,101 B1 | 5/2014 | Dimond | |
| 9,053,274 B1 | 6/2015 | Van Antwerpen et al. | |
| 9,098,669 B1 | 8/2015 | Alpert et al. | |
| 9,275,176 B2 | 3/2016 | Chuang | |
| 9,536,030 B2 | 1/2017 | Fricke et al. | |
| 9,576,092 B2 | 2/2017 | Platzker et al. | |
| 9,792,397 B1 | 10/2017 | Nagaraja | |
| 9,916,408 B2 | 3/2018 | Fawaz et al. | |
| 9,996,652 B2 | 6/2018 | Sinnadurai et al. | |
| 10,318,686 B2 | 6/2019 | Dhar et al. | |
| 10,387,603 B2 | 8/2019 | Sinnadurai et al. | |
| 10,558,775 B2 * | 2/2020 | Kim | G06F 30/3312 |
| 10,621,297 B1 | 4/2020 | Baumgartner et al. | |
| 10,664,561 B1 | 5/2020 | Kar et al. | |
| 10,885,249 B1 * | 1/2021 | Kollesar | G06F 30/3312 |
| 2003/0105617 A1 | 6/2003 | Cadambi et al. | |
| 2003/0163795 A1 * | 8/2003 | Morgan | G06F 30/39 |
| | | | 716/114 |
| 2004/0216064 A1 * | 10/2004 | Gass | G06F 30/327 |
| | | | 716/113 |
| 2008/0216038 A1 | 9/2008 | Bose | |
| 2012/0005643 A1 * | 1/2012 | Schroeder | G06F 30/392 |
| | | | 716/119 |
| 2012/0054699 A1 | 3/2012 | Cho et al. | |
| 2012/0151429 A1 * | 6/2012 | Barowski | G06F 30/392 |
| | | | 716/116 |
| 2013/0305197 A1 | 11/2013 | Baumgartner et al. | |
| 2013/0326455 A1 | 12/2013 | Alpert et al. | |
| 2015/0347644 A1 | 12/2015 | Arakawa et al. | |
| 2016/0098506 A1 | 4/2016 | Agarwal et al. | |
| 2016/0217245 A1 * | 7/2016 | Gregerson | G06F 30/398 |
| 2016/0224709 A1 | 8/2016 | Jayakumar et al. | |
| 2016/0314236 A1 * | 10/2016 | Bhanji | G06F 30/3312 |
| 2016/0321390 A1 | 11/2016 | Bozman et al. | |
| 2017/0011163 A1 * | 1/2017 | Berry | G06F 30/392 |
| 2017/0220722 A1 * | 8/2017 | Kim | G06F 30/392 |
| 2017/0344693 A1 * | 11/2017 | Abdul | G06F 30/398 |
| 2018/0004885 A1 * | 1/2018 | Affeldt | G06F 30/394 |
| 2018/0131351 A1 | 5/2018 | Lee et al. | |

OTHER PUBLICATIONS

Anonymous, "Incremental timing-driven placement to optimize the local clock network for high performance designs", IPCOM000215244D, Feb. 22, 2012, pp. 1-5.

Anonymous, "Method to perform timing driven placement to satisfy boundary timing contraints", IPCOM000235046D, Feb. 25, 2014, pp. 1-2.

Cho et al., "LatchPlanner: Latch Placement Algorithm for Datapath-oriented High-performance VLSI Designs" Proceedings of the International Conference on Computer-Aided Design. IEEE Press (Nov. 2013) pp. 342-348.

Kim et al., "Memory Element Graph-Based Placement in Integrated Circuit Design", U.S. Appl. No. 15/848,556, filed Dec. 20, 2017.

List of IBM Patents or Patent Applictions Treated as Related; (Appendix P), Date Filed Sep. 12, 2019, 2 pages.

Papa et al., "Rumble: An Incremental, Timing-driven, Physical-synthesis Optimization Algorithm", IEEE Transactions on Computer-Aided Design of Integrated Circuits and Systems, vol. 27, No. 12, Dec. 2008, pp. 2156-2168.

Transmittal Form PTO/SB/21, filed Mar. 18, 2020.

Kim et al., "Memory Element Graph-Based Placement in Integrated Circuit Design", U.S. Appl. No. 16/716,683, filed Dec. 17, 2019.

List of IBM Patents or Patent Applications Treated as Related; (Appendix P), Filed Jul. 6, 2020; 2 pages.

\* cited by examiner

US 11,030,367 B2

OUT-OF-CONTEXT FEEDBACK HIERARCHICAL LARGE BLOCK SYNTHESIS (HLBS) OPTIMIZATION

BACKGROUND

The present invention relates generally to hierarchical large block synthesis and the optimizing of child logic out of the context of the parent, and more specifically, to a method of improving the timing and placement of latches within the hierarchical blocks.

The process of creating an integrated circuit (IC), referred to as very large scale integration (VLSI) or chip design, includes many steps, some of which are repeated iteratively. Generally, combinational logic gates and memory elements (i.e., latches, flip-flops) are integrated into a process referred to as logic synthesis to implement the desired functionality of the IC. One of the results of the logic synthesis is a netlist that defines the connectivity among the various logic gates and memory elements that make up the IC.

This logic synthesis is ultimately transitioned into a layout of physical components in an arrangement that considers the timing, congestion, and power usage constraints of the IC design. Processes that are performed iteratively as part of this transition from the logic design to the physical layout are referred to as physical synthesis. Physical synthesis includes placement (i.e., defining the location of cells), clock and timing optimization (i.e., ensuring that timing constraints are met based on the location of cells and the resulting wire lengths of interconnects), and routing (i.e., defining paths for the wires interconnecting cells). The goal of physical synthesis is to generate a layout that meets timing, congestion, and power metrics. Once synthesized, a given child macro can be flattened into higher-level unit (sometimes referred to as the parent level), which allows the placements and routing connections of the flattened child macro to be considered when performing parent optimization.

SUMMARY

A non-limiting embodiment of the invention provides a method of developing an integrated circuit. The method includes identifying, via a computer processor, at least one first child latch placed at a first location in a first child macro included in a parent macro, and identifying, via the computer processor, at least one second child latch placed at a second location in a second child macro included in the parent macro. The second child latch is located a distance away from the first child latch. The method further includes determining, via the computer processor, a target timing parameter threshold and performing a latch optimization process to determine a first actual timing parameter. The method further includes changing, via the computer processor, one or both of the first location of the first child latch and the second location of the second child latch to reduce the distance, and generating an optimized parent macro based on the changed one or both first and second locations. The method further includes performing the latch optimization process to determine a second actual timing parameter based at least in part on the changed first and second locations.

According to another non-limiting embodiment of the invention, a system is configured to develop an integrated circuit. The system includes a latch identifier module configured to identify at least one first child latch placed at a first location in a first child macro included in a parent macro and to identify at least one second child latch placed at a second location in a second child macro included in the parent macro. The second child latch is located a distance away from the first child latch. The system further includes a latch location optimization module and a latch placement module. The latch location optimization module is configured to determine a target timing parameter threshold and to perform a latch optimization process to determine a first actual timing parameter. The latch placement module is configured to change one or both of the first location of the first child latch and the second location of the second child latch to reduce the distance and generate an optimized parent macro based on the changed one or both first and second locations. The latch location optimization module re-executes the latch optimization process to determine a second actual timing parameter based at least in part on the changed first and second locations.

According to yet another non-limiting embodiment of the invention, a computer program product is provided for developing an integrated circuit. The computer program product comprises a computer readable storage medium having program instructions embodied therewith. The program instructions are executable by a processor to perform a method including identifying, via a computer processor, at least one first child latch placed at a first location in a first child macro included in a parent macro, and identifying, via the computer processor, at least one second child latch placed at a second location in a second child macro included in the parent macro. The second child latch is located a distance away from the first child latch. The method further includes determining, via the computer processor, a target timing parameter threshold and performing a latch optimization process to determine a first actual timing parameter. The method further includes changing, via the computer processor, one or both of the first location of the first child latch and the second location of the second child latch to reduce the distance, and generating an optimized parent macro based on the changed one or both first and second locations. The method further includes performing the latch optimization process to determine a second actual timing parameter based at least in part on the changed first and second locations.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
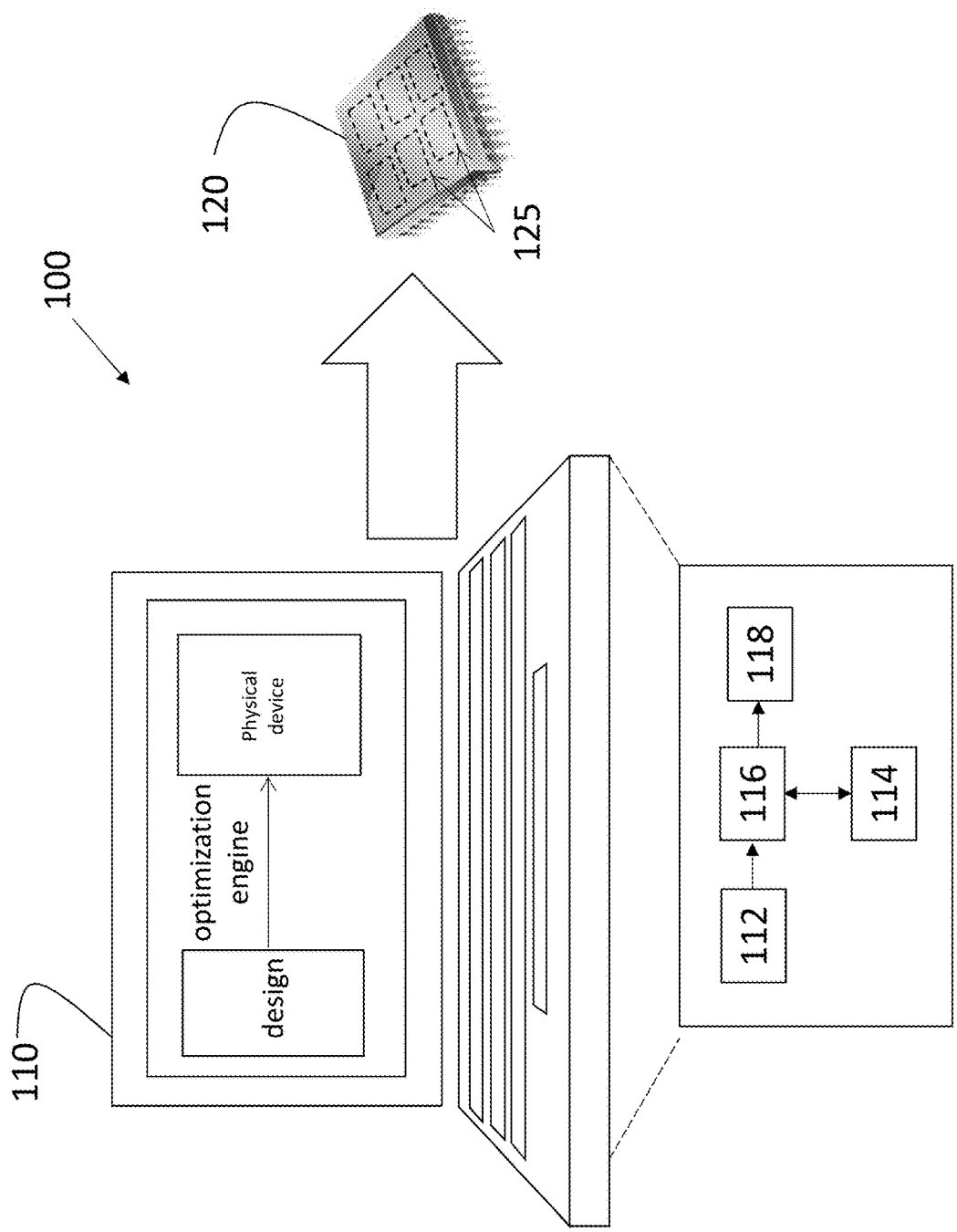
FIG. 1 is a block diagram of a physical synthesis system configured to perform out of context feedback optimization according to a non-limiting embodiment of the invention.

Current microprocessor trends are integrating traditionally custom designs with random logic macros (RLMs) into very large integrated circuit designs. In some cases, entire microprocessor units are designed using an automated synthesis flow that integrates these traditional custom designs and RLMs. This type of merged synthesis run is referred to as large block synthesis (LBS). The LBS blocks, i.e., sets of cells or logic modules, require handling dataflow designs differently than traditional RLMs. In this process the entire logic is usually flattened out, and timing-critical logic portions can be pre-optimized in order to improve the overall result. This pre-optimization uses multiple copies (instances) of the same block of logic whose cells have already been placed and routed. These hard-bounded blocks are fed into the flat synthesis.

Turning now to an overview of technologies that are more specifically relevant to aspects of the invention, a particular type of LBS referred to as hierarchical large block synthesis (HLBS) involves performing a 2-step process that transforms a unit into a synthesized super-large block. First, macros are synthesized and then unit integration level is synthesized, eventually flattening the macros. The placement of child logic circuit components (i.e., logic circuit components placed in child macros at the child level as opposed to the higher parent level) is generally predetermined based on slack and pin location. Problems can occur when child logic circuit component such as latches, for example, are optimized out-of-context and the latch locations in a child macro are determined during pre-optimization because it may later be discovered that there are long child-to-child latch paths (e.g., wire connections between a pair of child latches) during HLBS, which are difficult to subsequently optimize. Optimizing a child macro "out-of-context" refers to optimizing the components within a given child macro, without considering the components of the higher-level unit, i.e., out-of-context with respect to the parent level. In some instances, a first child latch may be included in a first child macro, while a second child latch is located in a different second child macro located remotely from the first child macro.

Latch-graph based placement techniques have been performed to optimize LBS designs by utilizing the placement of memory elements as a proxy for optimal placement of the complete set of design components to achieve improved performance results (e.g., timing, density). However, current latch-graph based placement techniques cannot be directly used to improve latch placements within an HLBS because it is typically undesirable to change the latches after performing synthesis on the child macros. More specifically, attempts to change the child latches after performing synthesis would cause secondary effects, which negate the benefits of the HLBS process. For instance, changes to the latches after synthesis would require a re-clustering of the latches, thereby forcing a complete redo and re-optimization of the entire child macro.

The optimization of the child latches can also be driven by boundary assertions and boundary pin locations. It has been found, however, that the boundary and pin location data does not provide enough information to drive the optimization tool to achieve reasonable and reproducible results because assertions can become stale. In addition, the assertions obtained from the boundary and pin data are very "local" and only encompass the worst slack. As a result, the process of clustering latches is deterministic but very sensitive to changing inputs. Accordingly, it is desirable to improve HLBS quality of result (QoR) by improving latch placement of the child latches.

Turning now to an overview of the aspects of the invention, one or more embodiments of the invention achieves an optimized logic circuit component placement in HLBS by analyzing the logic circuit component placement (e.g., latch placement) in the parent level and providing feedback improvements to the lower-level child macros. In one or more non-limiting embodiments, a method of optimizing an HLBS includes iteratively performing a process of performing a slack driven latch graph optimization, for example, on the HLBS to find optimal latch locations, performing consecutive child error corrective code runs (e.g., by performing physical synthesis corrective child-reruns), capturing results in files (e.g., VLSI Integrated Models (VIMs)) for further analysis and modification, and then repeating the process. Although the physical synthesis run, for example, can move latches towards critical boundary pins, and even if the assertions and boundary pin locations are accurate, the run still may not arrive at optimal latch placement because slack on the other side of a latch may prevent it from moving and/or the latches in the other children may change when those children are rerun. Therefore, utilizing feedback information indicating a global analysis of latch interconnectivity (i.e., an analysis of latch placement in the higher-level parent or "unit integration level") to improve child latch locations optimizes performance of the overall HLBS.

With reference now to FIG. 1, a physical synthesis system 100 configured to perform out-of-context feedback optimization on a physical design such as a semiconductor chip, for example, is illustrated according to a non-limiting embodiment. The physical synthesis system 100 includes a processing system 110 (e.g., computer) that implements one or more computer processors such as, for example, an electronic hardware synthesis controller 116 that controls one or more synthesis modules or engine. An input interface 112 (e.g., keyboard, mouse) may be used to develop the logic design which is stored in one or more memory devices 114 of the processing system 110. An output interface 118 (e.g., display, output port) displays a graphical layout or design resulting from the synthesis and/or provides information to place and route components of the physical implementation 120 (e.g., chip). The information includes, but is not limited to, the latch placement location, gate placement location, critical paths, critical gates on the critical path, anchor points, component locations with respect to one or more critical paths, and potential free-space locations, highlighted or emphasized ideal free-space location(s) with respect to a critical path(s) and existing components, and slack benefit values with respect to given free-space.

A slack benefit is a value indicating an improvement or degradation in slack timing provided by relocating a gate to a free-space. For instance, a critical path can include at least one gate coupled thereto that defines an initial slack timing value. Relocating the gate to a free-space may either improve the slack timing or degrade the slack timing. Thus, the slack benefit is essentially the amount of time (e.g., +/− picoseconds) by which the slack time is modified with respect to the initial slack timing.

The physical implementation 120 includes creating components (e.g., transistors, resistors, capacitors) and interconnections therebetween on a semiconductor (e.g., silicon wafer). The physical layout of circuit sub-blocks 125 affects the length of a connecting wire between components and, thus, the timing of signals between them, for example.

The synthesis controller 116 can include one or more individual sub-modules or sub-controllers that execute a respective physical synthesis operation. Although the operations of synthesis controller 116 are described going forward in terms of latches, it should be appreciated that the operations of the synthesis controller 116 can be applied to various other logic circuit components (e.g., logic gates, flip-flops, etc.) without departing from the scope of the invention.

Figure 2:
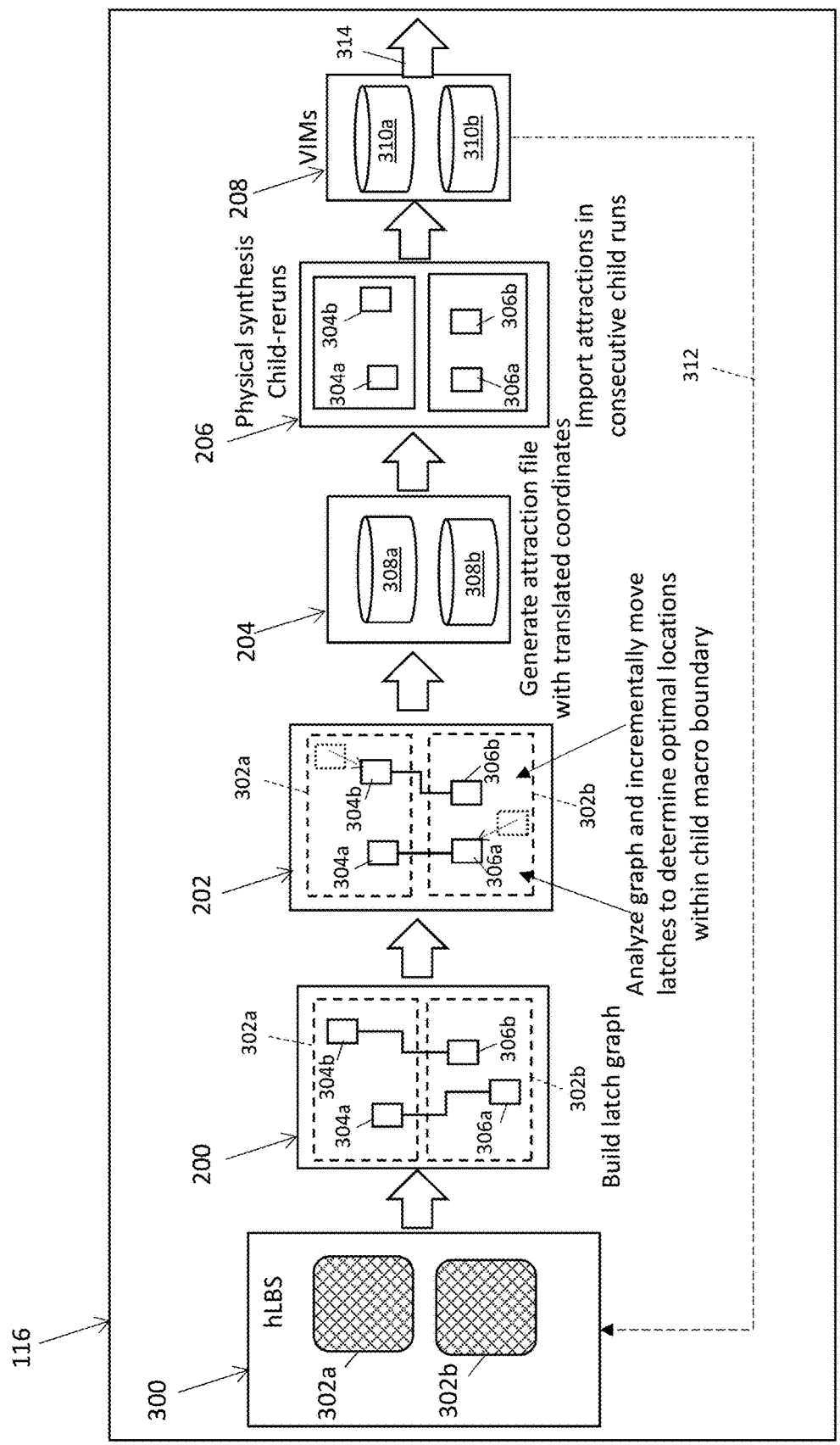
FIG. 2 is a block diagram of a physical synthesis controller included in the physical synthesis system illustrated in FIG. 1 according to a non-limiting embodiment of the invention.

In at least one non-limiting embodiment illustrated in FIG. 2, the synthesis controller 116 includes a latch identifier module 200, a latch location optimization module 202, a latch placement module 204, a child error correction module 206, and a file generator module 208. Although FIG. 2 illustrates separate individual modules 200-208, it should be appreciated that one or more of the modules 200-208 can be implemented together into a common or single module. In addition, each module 200-208 can be constructed as an individual hardware controller that executes algorithms, control logic, etc., stored in a respective memory unit to execute the respective synthesis operations of the given module.

The latch identifier module 200 receives an input hLBS design including one or more parent-level units 300. Each parent unit 300 includes a plurality of child macros 302a and 302b, which have been flattened into their respective parent unit 300. The latch identifier module 200 analyzes each parent-level unit 300 and determines the location of each child macro 302a, 302b, along with the location of each latch 304a, 304b, 306a, 306b placed within their respective child macro 302a, 302b.

In one or more non-limiting embodiments, the latch identifier module 200 generates a latch graph that identifies the location of each latch 304a, 304b, 306a, 306b placed within the child macro 302a, and child macro 302b. The latch identifier module 200 can convert a netlist into a latch graph indicating a plurality of nodes and edges associated with the latches in a given child macro. The latch graph can then be utilized by the latch location optimization module 202 to determine optimal placements for latches 304a, 304b, 306a, 306b. In one example, the latch graph can include latch-to-latch connections that are modeled by tracing the logic combinations defined by the input hLBS design, and optionally pruning latches based on the criticality of paths and/or fixed points.

The latch location optimization module 202 is configured to analyze the latch graph generated by the 200, and identify potential improvements to latch placements based on optimal latch-to-latch connections. In one or more non-limiting embodiments, the latch location optimization module 202 determines a target timing parameter or target timing parameter threshold and performs a latch optimization process to determine the actual timing parameter corresponding to a given child macros 302a/302b and/or the overall parent macro 300. The target timing parameter or threshold can include, for example, target slack parameters for a given latch, target latch path lengths between two latch pairs, a target setup time value, a target hold time value, and target clock skew rates.

The optimal latch-to-latch connections are determined without significant distortion to the child macro layout by utilizing a heuristic spreading to accommodate available logic areas. In one example, the latch location optimization module 202 can compute the best possible slack for each latch 304a, 304b, 306a, 306b and can compute a difference between the present slack and the best possible slack for a given latch 304a, 304b, 306a, 306b. The latch location optimization module 202 can also compute the pair-wise distances between a pair of latches (e.g., 304a and 306a, 304b and 306b, etc.) and determine a target slack for the latches 304a, 304b, 306a, 306b based on the pair-wise distances and the best possible slacks. In one or more embodiments, the latch-to-latch connections include one or more latches (e.g., 304a and 304b) placed in a first child macro (e.g., 302a), which are connected to latches (e.g., 306a, 306b) placed in a different second child macro (e.g., 302b) located a distance away from the first child macro (302a). Optimal locations of one or more latches 304a, 304b, 306a, 306b can then be achieved by adjusting a position of a given latch within its respective child macro according to a corresponding pair-wise distances to achieve its target slack.

The attraction file generation module 204 visits the optimized placement locations of step 202 and outputs a file format that can be imported by physical synthesis reruns of the children in step 206. Accordingly, the attraction file generation module 204 generates one or more attraction files 308a, and 308b indicating the placements (e.g., X-Y coordinates) of the latches 304a, 304b, 306a, 306b for the respective child macro 302a and 302b.

The child error correction module 206 receives the attraction files 308a and 308b from the latch placement module 204 and performs a consecutive error correction run for the respective children. In one or more embodiments, the child error correction module 206 utilizes a physical synthesis flow that places latches 304a, 304b, 306a, 306b at the locations determined by step 202.

The attraction files generated by step 202 define the desired locations of each latch within the child, or a subset of the latches within the child. The purpose of these files is to provide the child RLM rebuild with latch locations that are globally optimal. Because these attraction files are generated at the parent level they will provide the child with guidance better than that provided by timing assertions and/or boundary pin locations. Also, because step 202 operates at the parent level, the attractions generated for the children are translated such that they will be valid and relative to the bounding box of the child.

The attraction files 308a and 308b define a single point of attraction for each of the latch within the child (e.g. 304a, 304b, 306a, 306b), or a subset of the latches within the child. This attraction point instructs the placement engine and placement utilities used by the RLM build (physical synthesis flow) of step 206 to place the specified object as close to the attraction point as possible. Alternatively, the attraction file may define a rectangular area for which the latch should be placed, or other soft constraints to allow placement utilities and consecutive clock-optimization steps to build or create the proper clock tree network.

The desired outcome of this process is a resultant RLM in which the final latch placements of step 206 closely match those as specified by the analysis step 202. This feedback approach provides the out of context child run with latch locations that are improved over those created by traditional means that use boundary assertions and boundary pin locations. A secondary benefit of this process is that it can help stabilize the construction of the RLMs by taming non-determinism in the optimization flow, which arises due to the nature of multi-threaded optimizations or through small changes to boundary assertions.

The file generator module 208 generates one or more VLSI integrated model (VIM) netlists 310a and 310b, which represents the individual connections between the routing paths and the placed latches within the boundary of a respective child macro. The VIM netlist(s) 310a and 310b are then utilized as a feedback input 312 and returned to the latch identifier module 200. The process described above can be repeated such that the placements indicated in the feedback VIM netlists 310a and 310b can be re-evaluated and the latch placements within the child macros 302a and 302b can be further incremented and optimized. By repeating the processes described above on a series of consecutive feedback VIM netlist inputs 310a and 310b the system can take into account the slack on an opposing side of a given latch 304a, 304b, 306a, 306b which may otherwise have prevented the system from moving a given latch in a previous iteration and/or can re-evaluate the slack of latches in other children macros that may have changed after re-evaluating a given child macro.

Once optimized, the synthesized output 314 generated by the file generator module 208 can be delivered to the output interface 118 (see FIG. 1) to finalize the design. The finalized design can then be utilized by one or more fabrication tools or a foundry system to facilitate fabrication of the physical implementation 120 (e.g., to fabricate a physical chip). A foundry system, for example, may include several fabrication tools including, but not limited to, steppers for photolithography, etching tools, cleaning tools, doping tools, and dicing tools. In one or more embodiments, the synthesized output 314 is generated following a logical synthesis, which creates a physical design ("PD") VIM netlist that is forwarded to the physical designer. A physical designer is involved in the "back end" of the design process, where low-level design decisions are made. The physical designer can run the PD VIM netlist through physical design tools, which places and routes the ultimate, low-level physical components of the chip, such as the latches, pins and wires. The design is ultimately sent to a foundry, where the masks for chip processing are finalized.

Figure 3:
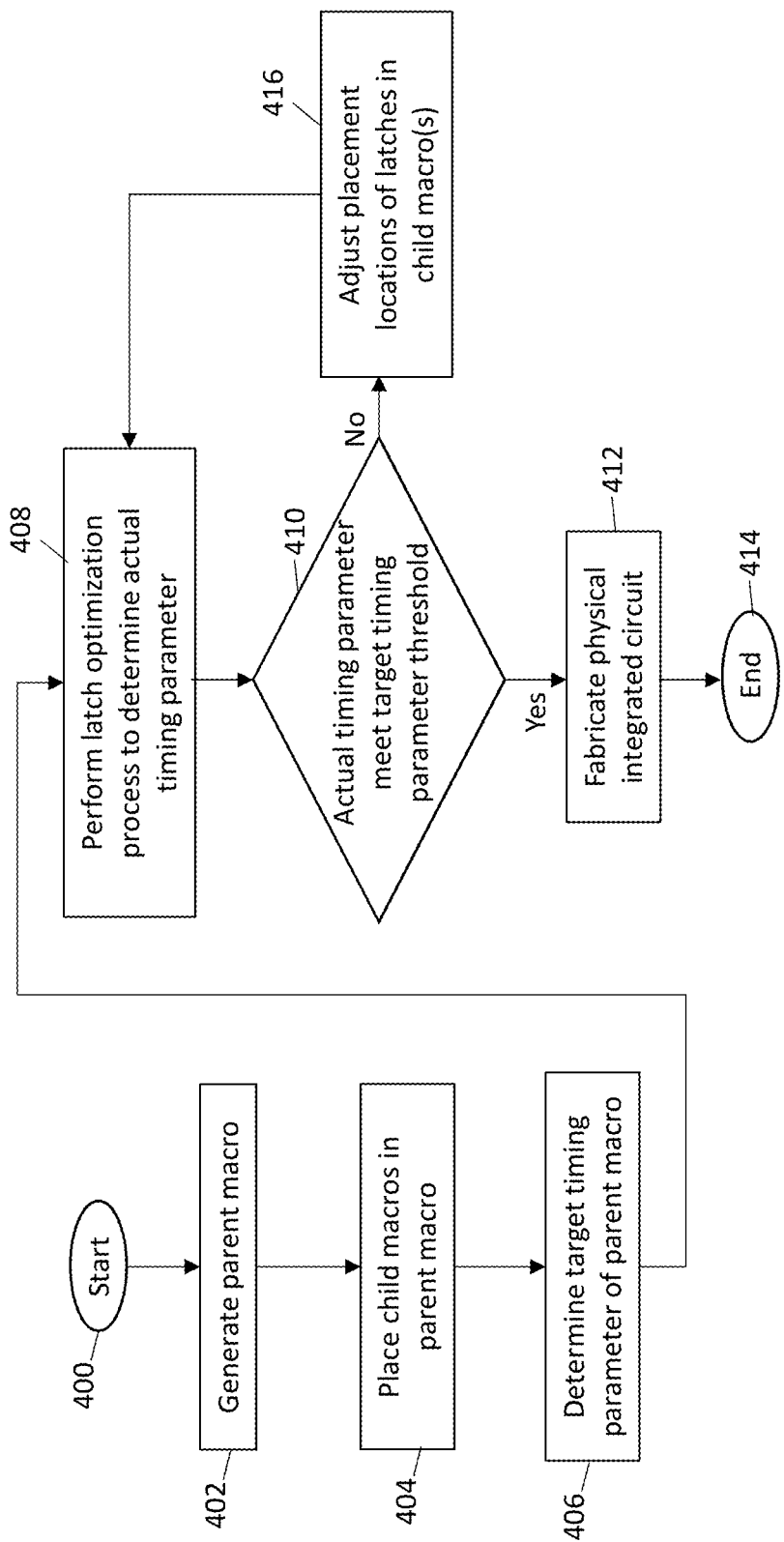
FIG. 3 is a flow diagram illustrating a method of performing an out-of-context feedback HLBS optimization process to develop an IC according to a non-limiting embodiment of the invention.

Turning now to FIG. 3, a method of performing an out-of-context feedback HLBS optimization process to develop an IC is illustrated according to a non-limiting embodiment of the invention. The method begins at operation 400, and a parent macro of a HLBS design is generated at operation 402. At operation 404, a plurality of child macros containing pre-optimized logic (e.g. latches) are loaded (e.g., from memory or a data storage device) and are physically placed within the parent macro. The placement of the child macros includes, for example, performing a flattening process that flattens the hierarchical netlists representing the child macros into the parent macro. In one or more embodiments of the invention, the latches are placed in their respective child macros "out-of-context" with respect to parent macro, i.e., without considering the components of the higher-level parent macro. At operation 406, a target timing parameter of the parent macro is determined. The target timing parameter or threshold can include, for example, target slack parameters for a given latch, target latch path lengths between two latch pairs, a target setup time value, a target hold time value, and target clock skew rates.

At operation 408 an optimization process is performed to determine an actual timing parameter resulting from the present latch placement of the flattened child macros, and the actual timing parameter is compared to the target timing parameter at operation 410. When the actual timing parameter satisfies the target timing parameter (e.g., falls within a target timing parameter threshold range), a physical implementation (e.g., physical chip) can be fabricated at operation 412 and the method ends at operation 414. When, however, the actual timing parameter does not satisfy the target timing parameter (e.g., falls outside the target timing parameter threshold range), the placement of one or more latches within a child macro is adjusted at operation 416. In one or more embodiments, the placement of one latch in a first child macro is adjusted with respect to another latch in a different second child macro. In this manner, the lengths of latch-to-latch connection paths between the two child macros can be shortened, thereby optimizing the overall parent macro. The placement locations can continuously repeated at operation 408 and the resulting timing parameters can be used as a feedback input that is used to subsequently re-evaluate and further optimize the child macros until the target parameters are satisfied. Once the target parameters are satisfied at operation 410, a physical implementation (e.g., physical chip) is fabricated at operation 412 and the method ends at operation 414.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of developing an integrated circuit, the method comprising:
   identifying, via a computer processor, at least one first child latch placed at a first location in a first child macro included in a parent macro and identifying, via the computer processor, at least one second child latch placed at a second location in a second child macro included in the parent macro, the second child latch located a distance away from the first child latch, wherein the at least one first child latch and the at least one second child latch are placed in the first location and the second location, respectively, out-of-context with respect to the parent macro and without considering components of the parent macro;
   determining, via the computer processor, a target timing parameter threshold and performing a latch optimization process to determine a first actual timing parameter;
   changing, via the computer processor, one or both of the first location of the first child latch and the second location of the second child latch to reduce the distance and generating an optimized parent macro based on the changed one or both first and second locations; and
   performing the latch optimization process to determine a second actual timing parameter based at least in part on the changed first and second locations.

2. The method according to claim 1, further comprising continuously changing one or both of the first and second child latches and performing the latch optimization process until the second actual timing parameter satisfies the target timing parameter.

3. The method of according to claim 2, wherein a current latch optimization process is performed on an updated optimized parent macro generated from a most recently performed optimization process.

4. The method according to claim 3, wherein the first and second child macros have a first hierarchical level assigned thereto and the parent macro has a second hierarchical level assigned that is higher than the first hierarchical level.

5. The method according to claim 4, further comprising:
   generating, via the computer processor, the parent macro in a hierarchical large block synthesis (hLBS) design of the integrated circuit; and
   placing, via the computer processor, a plurality of logic circuit components in the first and second of child macros out-of-context with respect to the parent macro.

6. The method according to claim 5, further comprising performing a flattening operation that flattens the first and second of child macros into the parent macro, wherein the latch optimization process to determine the first actual timing parameter is performed after performing the flattening operation.

7. The method according to claim 1, further comprising causing to be fabricated a physical integrated circuit that includes a physical implementation of the optimized parent macro in response to the second actual timing parameter satisfying the target timing parameter, and wherein the target timing parameter is a parameter selected from a group comprising target slack parameters for a given latch, target latch path lengths between two latch pairs, a target setup time value, a target hold time value, and target clock skew rate.

8. A system configured to develop an integrated circuit, the system comprising:
   a latch identifier module configured to identify at least one first child latch placed at a first location in a first child macro included in a parent macro and to identify at least one second child latch placed at a second location in a second child macro included in the parent macro, the second child latch located a distance away from the first child latch, wherein the at least one first child latch and the at least one second child latch are placed in the first location and the second location, respectively, out-of-context with respect to the parent macro and without considering components of the parent macro;
   a latch location optimization module configured to determine a target timing parameter threshold and to perform a latch optimization process to determine a first actual timing parameter; and a latch placement module configured to change one or both of the first location of the first child latch and the second location of the second child latch to reduce the distance and generate an optimized parent macro based on the changed one or both first and second locations, wherein the latch location optimization module re-executes the latch optimization process to determine a second actual timing parameter based at least in part on the changed first and second locations.

9. The system according to claim 8, wherein the latch location optimization module continuously changes one or both of the first and second child latches and the latch location optimization module continuously re-executes latch optimization process until the second actual timing parameter satisfies the target timing parameter.

10. The system of according to claim 9, wherein the latch location optimization module performs a current latch optimization process on an updated optimized parent macro generated from a most recently performed optimization process.

11. The system according to claim 10, wherein the first and second child macros have a first hierarchical level assigned thereto and the parent macro has a second hierarchical level assigned that is higher than the first hierarchical level.

12. The system according to claim 11, wherein the latch identifier module generates the parent macro in a hierarchical large block synthesis (hLBS) design of the integrated circuit, and places a plurality of logic circuit components in the first and second child macros out-of-context with respect to the parent macro.

13. The system according to claim 12, wherein the latch identifier module performs a flattening operation that flattens the first and second of child macros into the parent macro, and determines the first actual timing parameter after performing the flattening operation.

14. The system according to claim 8, wherein the optimized parent macro causes fabrication of a physical integrated circuit that includes a physical implementation of the optimized parent macro, and wherein the target timing parameter is a parameter selected from a group comprising target slack parameters for a given latch, target latch path lengths between two latch pairs, a target setup time value, a target hold time value, and target clock skew rate.

15. A computer program product for developing an integrated circuit, the computer program product comprising a computer readable storage medium having program instructions embodied therewith, the program instructions executable by a processor to perform a method comprising:

identifying, via a computer processor, at least one first child latch placed at a first location in a first child macro included in a parent macro and identifying, via the computer processor, at least one second child latch placed at a second location in a second child macro included in the parent macro, the second child latch located a distance away from the first child latch, wherein the at least one first child latch and the at least one second child latch are placed in the first location and the second location, respectively, out-of-context with respect to the parent macro and without considering components of the parent macro;

determining, via the computer processor, a target timing parameter threshold and performing a latch optimization process to determine a first actual timing parameter;

changing, via the computer processor, one or both of the first location of the first child latch and the second location of the second child latch to reduce the distance and generating an optimized parent macro based on the changed one or both first and second locations; and performing the latch optimization process to determine a second actual timing parameter based at least in part on the changed first and second locations.

16. The computer program product according to claim 15, further comprising:

continuously changing one or both of the first and second child latches and performing the latch optimization process until the second actual timing parameter satisfies the target timing parameter; and causing to be fabricated a physical integrated circuit that includes a physical implementation of the optimized parent macro in response to the second actual timing parameter satisfying the target timing parameter.

17. The computer program product of according to claim 16, wherein a current latch optimization process is performed on an updated optimized parent macro generated from a most recently performed optimization process.

18. The computer program product according to claim 17, wherein the first and second child macros have a first hierarchical level assigned thereto and the parent macro has a second hierarchical level assigned that is higher than the first hierarchical level.

19. The computer program product according to claim 18, further comprising:

generating, via the computer processor, the parent macro in a hierarchical large block synthesis (hLBS) design of the integrated circuit; and placing, via the computer processor, a plurality of logic circuit components in the first and second of child macros out-of-context with respect to the parent macro.

20. The computer program product according to claim 19, further comprising:

performing a flattening operation that flattens the first and second of child macros into the parent macro, wherein the latch optimization process to determine the first actual timing parameter is performed after performing the flattening operation, wherein the target timing parameter is selected from a group comprising target slack parameters for a given latch, target latch path lengths between two latch pairs, a target setup time value, a target hold time value, and target clock skew rate.

* * * * *